US010380268B2

(12) United States Patent
Yeh

(10) Patent No.: US 10,380,268 B2
(45) Date of Patent: Aug. 13, 2019

(54) METHODS AND SYSTEMS FOR RAPID WEBPAGE ACCESS

(71) Applicant: Blazee, Inc., Fremont, CA (US)

(72) Inventor: Chienpyng Yeh, Fremont, CA (US)

(73) Assignee: Blazee, Inc., Fremont, CA (US)

( * ) Notice: Subject to any disclaimer, the term of this patent is extended or adjusted under 35 U.S.C. 154(b) by 247 days.

(21) Appl. No.: 14/639,072

(22) Filed: Mar. 4, 2015

(65) Prior Publication Data

US 2015/0254300 A1 Sep. 10, 2015

Related U.S. Application Data

(60) Provisional application No. 62/007,585, filed on Jun. 4, 2014, provisional application No. 61/947,566, filed on Mar. 4, 2014.

(51) Int. Cl.
*G06F 17/00* (2006.01)
*G06F 17/30* (2006.01)
*H04N 21/858* (2011.01)
*H04N 21/81* (2011.01)
*H04N 21/4722* (2011.01)

(52) U.S. Cl.
CPC ... *G06F 17/30386* (2013.01); *H04N 21/4722* (2013.01); *H04N 21/812* (2013.01); *H04N 21/8586* (2013.01)

(58) Field of Classification Search
CPC .............. G06F 17/30876; G06F 17/30; G06F 17/30312; G06F 17/30371; G06F 17/30395
See application file for complete search history.

(56) References Cited

U.S. PATENT DOCUMENTS

2006/0206709 A1* 9/2006 Labrou ................. G06Q 20/18
713/167

* cited by examiner

*Primary Examiner* — Truong Vo
(74) *Attorney, Agent, or Firm* — U.S. Fairsky LLP; Yue (Robert) Xu

(57) ABSTRACT

The disclosed method and system allow a user to conveniently access a webpage using a short code without typing a web address. To solicit a user to see a webpage, the user will be given a short code that is easy to remember instead of a full web address. Later, the user will send the code to a directing server, where a corresponding relationship between the short code and the intended web address has been previously recorded, and the user will be directed to the webpage. The supply of easy-to-memorize short codes is limited by the possible number of combinations of a few digits; however, this method and system can be universally used without feeling the lack of available codes because each short code is designed to be valid only in a limited geographic area and for a limited time frame.

18 Claims, 5 Drawing Sheets

METHODS AND SYSTEMS FOR RAPID WEBPAGE ACCESS

CROSS REFERENCES TO RELATED APPLICATIONS

This application claims the benefits of provisional patent application No. 61/947,566 filed on Mar. 4, 2014, and provisional patent application No. 62/007,585 filed on Jun. 4, 2014, the entire content of which is incorporated herein by reference.

BACKGROUND OF THE INVENTION

Traditionally, a TV is for receiving and playing back broadcast from broadcasters such as TV stations, satellites, and cable operators. The broadcasters, and ultimately the major networks such as ABC, CBS, and HBO, or local stations, determine what they show and when they show any program. A viewer can only tune in or tune out. With the advent of broadband internet, internet enabled TV or streaming devices such as set top boxes and BlueRay disk players allow viewers to stream TV content from the internet. For example, a subscriber to Netflix or Amazon Prime can choose the movie they want and watch it at any time. Thus, with broadband internet, the viewers gain more control of what they watch and when they watch. In turn, the broadcasters lose some control of the TV screen and potentially some advertisement revenue.

The smart TVs or smart set top boxes put even more control of the TV screen into the viewers' hands. Google TV is one of the major smart TV set top boxes, and its home screen is not any of the TV channels. Instead, the screen shows YouTube, Google Play, Chrome, Search, and other services offered by Google. Similarly, another major brand Apple TV starts with iTunes, Netflix, huluplus, and other offerings from the internet. TV shows only take a minor space on the start screen, and viewers have to push a few buttons before watching any TV broadcast. It is estimated that half of all new TVs sold in 2015 will be smart TVs running some kind of operating systems. As a result, the broadcasters are expected to lose more control of the TV screen and advertisement revenue.

A major feature of the smart TVs or set-top boxes is the ability to run various apps, such as apps to stream movie, TV, radio or music from various sources, apps to browse webpages, apps to access social network sites such as Facebook and Twitter, and the ability to install and run additional custom apps. Some examples of apps include Netflix and Amazon for watching movies, DailyBurn for workout, Skype for video call, AccuWeather for weather forecast, and Angry Bird for video game. The potential for the variety and function of the apps are unlimited. Similar to picture-in-picture, many smart TVs are able to display TV contents, an app, and/or a web browser on the TV screen simultaneously. On one hand, this can be viewed as traditional TV broadcasters losing the TV screen to web contents. On the other hand, there is an opportunity for traditional TV broadcasters to add interactivity with viewers via the internet and enhance the TV experience.

A broadcaster, at times, would like to point the audience to a particular webpage, for example, a webpage for ordering a product, for voting or polling an opinion, or for more information on the broadcasting program. However, this is not without difficulties. First, the URL (uniform resource locator) of a webpage is usually quite long. It is not easy for an audience to remember a URL especially if it is spoken orally on TV or radio. Additionally, it is prone to making typos to type in a URL particularly if the URL includes misspelled words or meaningless character strings. It is equally cumbersome to ask the audience to go to a homepage and follow a link or type in a code because there are too many distractions on that homepage. An audience is likely to be distracted by something else on the homepage rather than following the instructions.

Therefore, to improve the interaction between a broadcast program and the viewer via webpages on the internet, a solution is required to conveniently link the broadcasting program to the webpage that is designated by the broadcaster in real time.

SUMMARY OF THE INVENTION

A system and method of the present invention enable the audience of a television or radio program to quickly find a webpage intended by the broadcaster in real time. In some embodiments, a viewer or listener will be able to connect to the webpage by typing a short code that is displayed on the TV screen or broadcast orally from a TV program or radio program without the need to type a long web address. The webpage may allow the audience to interact with the program that is being broadcasted. For example, the webpage may include additional information on the broadcast program, or on-line ordering capability in case the broadcast is a commercial advertisement, merchant items, or auction. In other examples, a public chat board, a survey, or voting may be provided on the webpage corresponding to news or other specific broadcasting programs. The convenient and real time interaction between the audience and the broadcasting program will enhance the TV viewing and radio listening experience and increase the effectiveness of TV and radio programs.

DETAILED DESCRIPTION OF THE INVENTION

The present invention will now be described in connection to some preferred embodiments, with reference to the attached drawings.

Figure 1:
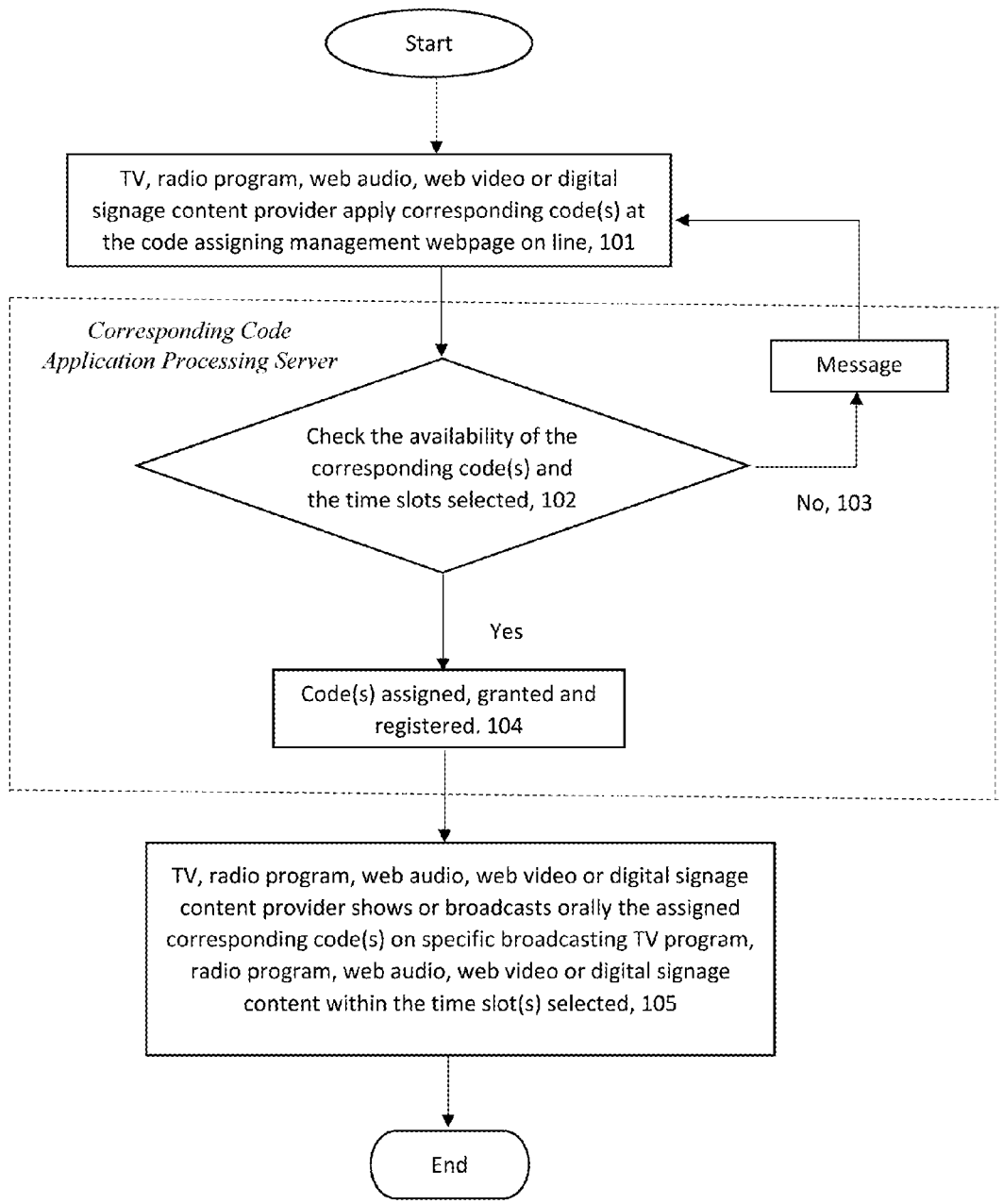
FIG. 1 is a schematic diagram showing a process for assigning a corresponding code to a corresponding web address.

A corresponding code is used to identify a corresponding webpage that may be related to a TV show, a radio show, a web video, a digital signage display, or another broadcast media. In an embodiment as shown in FIG. 1, a business customer, for example a TV program provider, begins by applying for a corresponding code for a TV show from a code assigning management webpage online, 101. The TV show is scheduled to broadcast at a certain time slot. A corresponding code application processing server processes the application and checks the availability of the corresponding code for the proposed time slot, 102. If a corresponding code is unavailable for the proposed time slot, a message informing the unavailability is sent to the TV program provider. On the other hand, if a corresponding code is available, the code is assigned and granted, and the information is communicated to the TV program provider. Once the TV program provider accepts the code, it is registered, 104. Optionally, the administrator of the corresponding code may charge a fee to the TV program provider for processing the corresponding code assignment. In an aspect of the embodiment, more than one corresponding code may be available for a proposed time slot, and the TV program provider is presented with more than one available corresponding codes. The TV program provider then chooses one or more desired corresponding codes. In another aspect of the embodiment, the TV program provider may propose one or more preferred corresponding codes to the corresponding code application server, for example, the code "8888" or other desirable codes. The code administer checks the availability of the proposed codes. If none of the proposed codes is available for the proposed time slot, a message is sent to inform the business customer, and the process restarts. If one or more codes are available, the corresponding code administer will communicate with the TV program provider to choose and register one or more available corresponding codes. The business customer will send a corresponding web address that corresponds with the corresponding code to the corresponding code application processing server. A web address is usually a URL. The corresponding code application server then saves the corresponding code and the matching corresponding web address in a directing database, along with a time frame limitation during which the corresponding code is valid. In an aspect of the embodiment, the business customer may send geographic location criterion of where the corresponding code should be effective. For example, an advertiser in Los Angeles may limit that searches using its designated corresponding code is valid only if the search is conducted from Los Angeles County. An advantage of having a geographic location limitation is that the same code may be used by different business customers at different locations at the same time. For example, a Toyota dealer in Los Angeles may use the code "Toyota" to link its web page with promotional information in Los Angeles, and another Toyota dealer in San Francisco may use the same code to link to a web page with promotional information in San Francisco. A search for the code in Los Angeles will only return the web page with Los Angeles information. Conversely, a search for the corresponding code conducted from San Francisco will only return the San Francisco web page, and a search conducted from outside of Los Angeles and San Francisco will return an error message. In some other aspects of the embodiment, the geographic location limitation may be very wide or entirely open. The corresponding code application server will save the geographic location limitation, corresponding code, time frame, and the corresponding web address in the database. Additional criteria information may be saved in the database. For example, age criterion may be a limitation in accessing some corresponding web page.

In another aspect of the embodiment, the corresponding webpage is a webpage on the business customer's website, for which the business customer may own the domain name. In yet another aspect of the embodiment, the business customer may be a small business that does not own a website. Then the corresponding webpage may be on a website of the provider of the directing server or on a third party's website. In either case, the corresponding webpage is for the benefit of the business customer.

Usually a corresponding code is a short alphanumeric code and is effective for only a predetermined time frame that is determined by the business customer. For example, a corresponding code for a product ordering webpage that corresponds to a TV advertisement may be effective beginning from the time when the advertisement is broadcast, and lasts for only a day. However, an advertisement may be broadcast for several times a day for many days. In this case, the corresponding code will last for the same as many days. When a corresponding code expires for one application, it can be re-used with another application in a future time. In an aspect of the invention, the corresponding code is designed in a way that is easy to input. For example, the code can be an alphanumeric code 1-8 digits long. Preferably, the code is 2-7 digits long. In some aspects, the code is preferably 2-5 digits long. For radio broadcast, a code 1-3 digits long is easy for audience to remember. Here, the digits may refer to numbers and alphabetic characters. In another aspect of the invention, the corresponding code may include an easy to remember phrase related to the corresponding subject, which may include symbols, special characters, and more digits. On the other hand, the corresponding code will be designed such that unintended matching is minimized. For example, if a user makes a mistake on one digit, preferably the user is given an error message, rather than being directed to an unintended webpage. When the corresponding code of this invention becomes widely used worldwide, the code may require more digits. In another aspect, where the local language is not English, the corresponding code may include characters from the local language. For example, a corresponding code for use in China may include Chinese characters. For clarity, the definition of alphanumeric code may include alphabets and characters from any language, numbers, symbols, and special characters. When a particular corresponding code expires, the corresponding webpage does not necessarily expire. It may still be found by typing in the web address, which is typically a URL.

Figure 2:
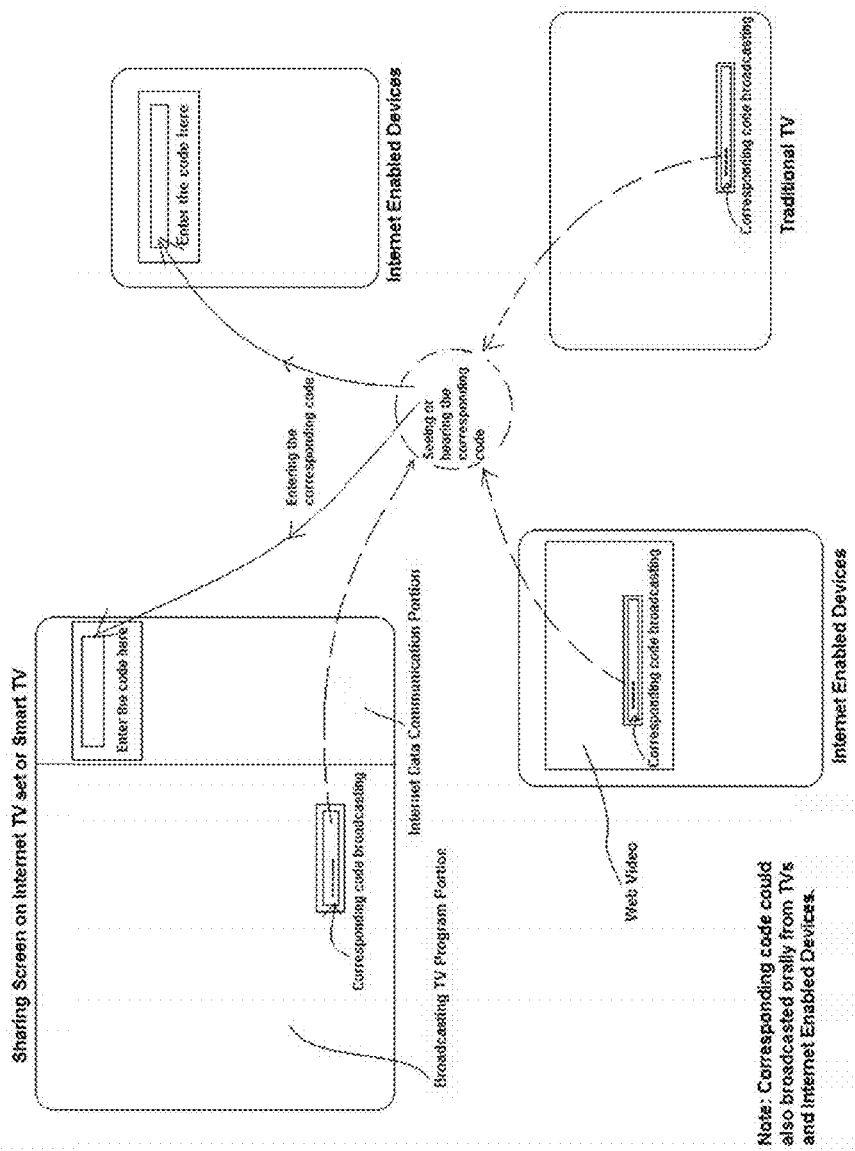
FIG. 2 shows some uses of corresponding codes on Smart TV, traditional TV, and web video.

In a preferred embodiment as shown in a block diagram in FIG. 2, a TV screen is divided to show a TV program in a first area and a directing internet application in a second area. In normal operation, the TV program may occupy the whole screen. Then a corresponding code may be shown on the TV program or announced orally by the broadcaster. For example, during a commercial of a merchant item, the words "To order, enter 12345 on Riatt" may be shown on the TV screen or announced orally. Here, the "12345" is the corresponding code, and "Riatt" refers to the directing internet application. The directing internet application can be given any name. If a viewer is interested in buying or learning more about the merchant item, the viewer will launch the Riatt application or browse to riatt.com using a web browser. The application occupies a part of the TV screen, on the right hand side as shown, or it can be on the left, top, or bottom side, or as a floating window in an inside area. The internet application will show an input field, and the viewer may enter the code using a remote control or an appropriate input device. The viewer will then be directed to the corresponding webpage.

Many hardware and software configurations can be employed. In an aspect of the embodiment, the TV may be a smart TV that is capable of running custom software applications. Alternatively, the TV may be not a smart TV but is connected to a smart device that is capable of running customized application. In both configurations, the TV program, the directing internet application, and the subsequently launched web browser are shown on the same TV screen. In another aspect, the directing internet application is installed on a separate internet enabled device such as a smart phone, a smart pad, or a computer, where the user will view the corresponding webpage. This allows the user to use a traditional TV and still be able to quickly interact with the TV show. In another aspect of the embodiment, video files can be streamed through internet enabled devices, and a corresponding code may be shown or orally announced on those web videos.

Figure 3:
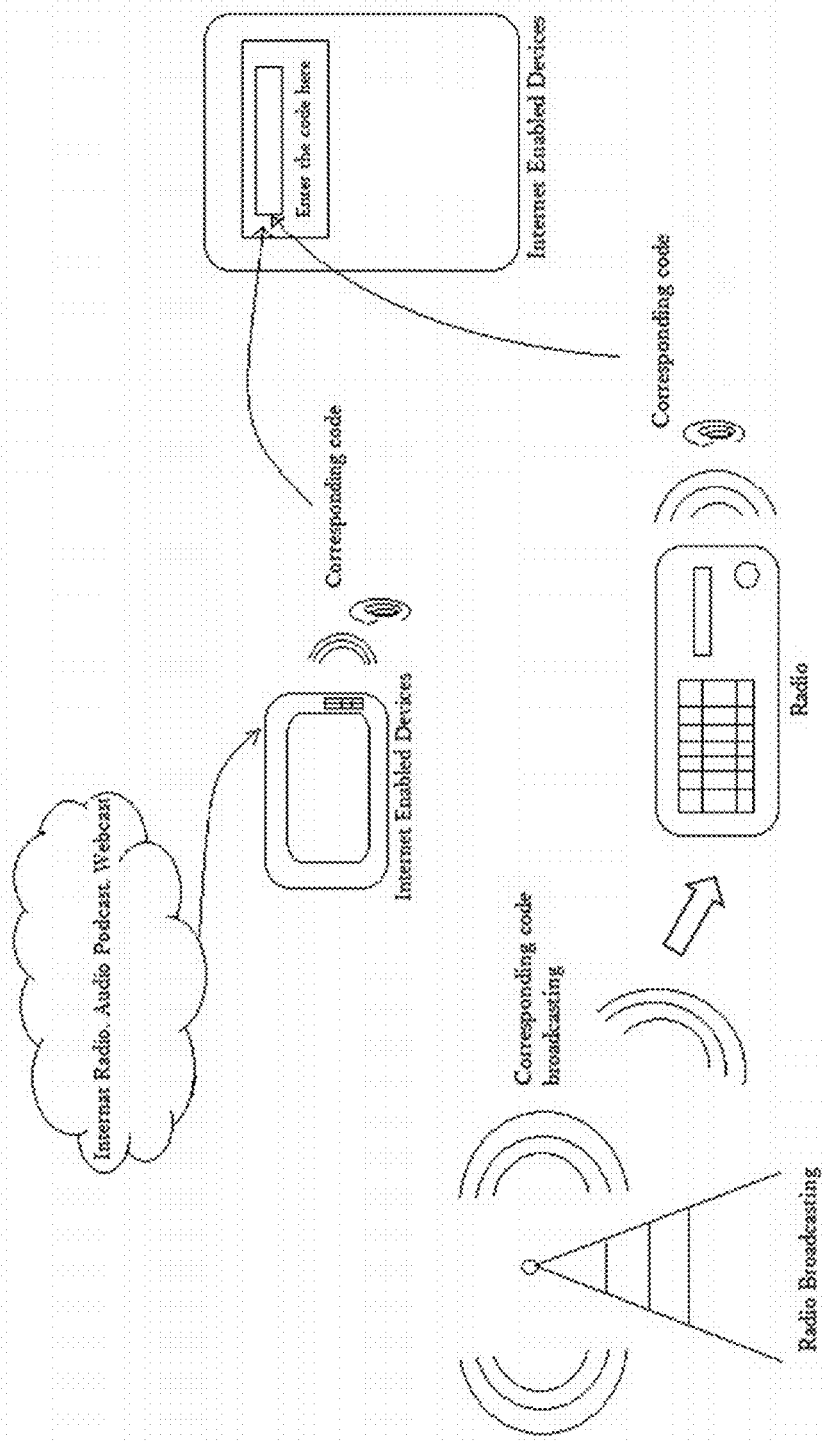
FIG. 3 shows some ways that corresponding codes can be used in radio broadcast and other audio programs.

In another embodiment as shown in FIG. 3, the user may also obtain the corresponding code from a media other than a TV show, for example, a radio show or another form of audio program, broadcast on air or online through the internet, where a corresponding code is broadcasted orally during the show. The audience will hear the short corresponding code on the radio or from an internet enabled device. Alternatively, the corresponding code may be shown together with the advertised subject on a digital signage, out-of-home. If the audience is interested in accessing the advertised subject, he or she will then launch the directing internet application on an internet enabled device and enter the code. The directing internet application may be an independent application installed locally on an internet enabled device. Alternatively, the user may access the directing internet application on the internet using a web browser.

There are several alternatives as to how the directing internet application may work with a user's web browser. The directing internet application may be integrated with the web browser as a tool bar. This will allow the field for entering the corresponding code to be always on the browser and make it easy for the user to enter the code. Alternatively, the directing internet application may be accessed through a browser and run as a web-based application. The user will browse to the application's web address, and the application will run in the user's browser and show the field for entering the corresponding code. In yet another alternative, the directing internet application will run on the remote server and be accessed as a web page. When the user browses to the web page, a field for entering the corresponding code will be shown on the browser. The user enters the corresponding code, and will be shown the corresponding web address or will be redirected to the corresponding web page.

Figure 4:
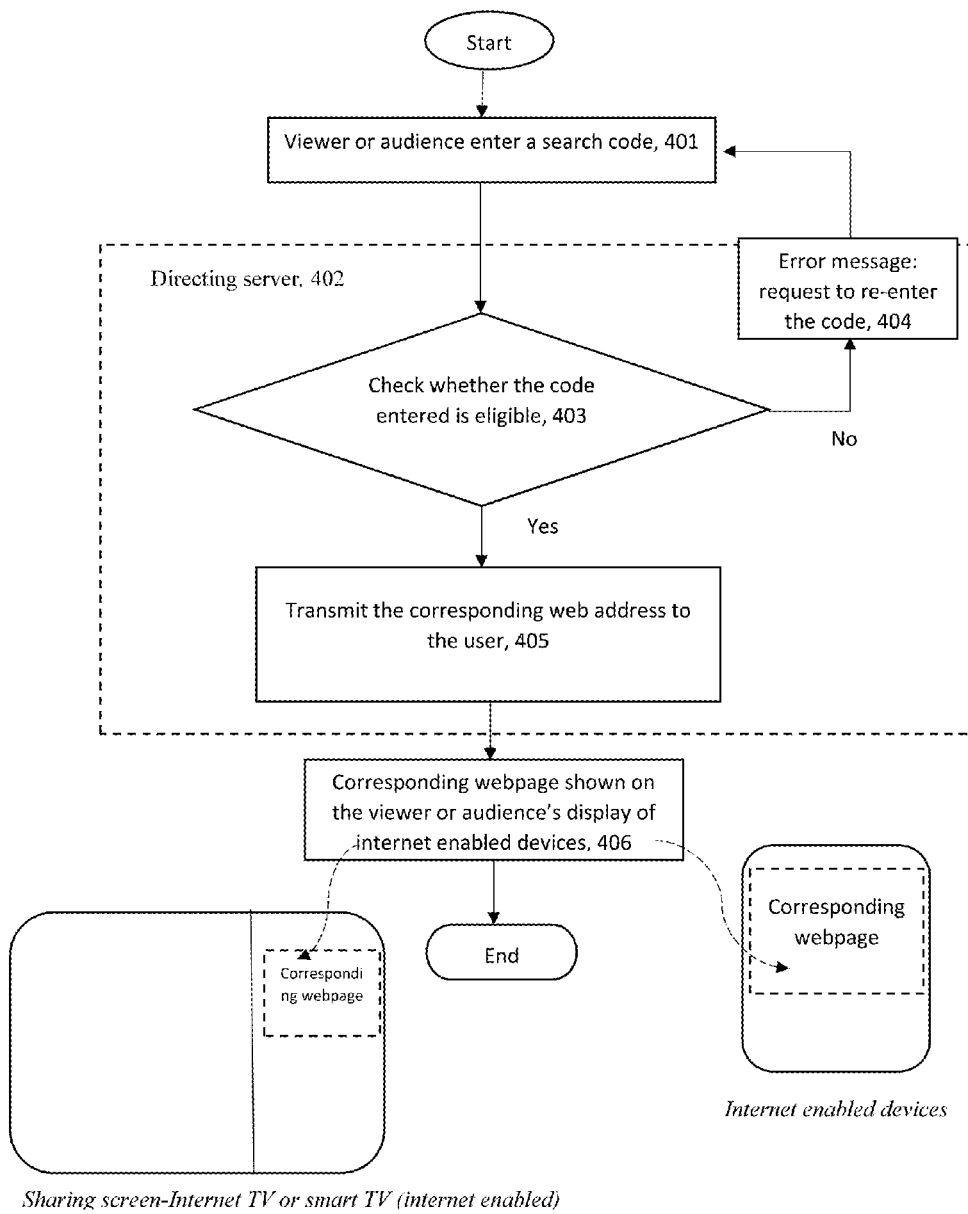
FIG. 4 is a schematic diagram showing the process for retrieving a corresponding web address from the user input of a corresponding code.

FIG. 4 shows a preferred embodiment of a process for redirecting a browser to a corresponding webpage using a corresponding code. The process begins by a user entering a search code into the directing internet application, 401. The directing internet application sends the code to a directing server 402 via internet. The directing server may or may not be the same computer server as the corresponding code application processing server. The directing server searches the search code for a match with a corresponding code in the directing database. If there is no match, an error message will be sent to the directing internet application 404, for example, "Invalid code. Please reenter the code." If a match is found, the server further checks whether the search is conducted within the predetermined time frame when the matching relationship between the corresponding code and the corresponding web address is valid. If it is not, an error message will be sent. If it is within the predetermined time frame, the directing server retrieves the corresponding web address and sends it back to the user, 405. The internet application may then automatically launch a web browser and direct the web browser to the corresponding webpage at the corresponding web address, 406. In another aspect, only currently valid corresponding codes are available for searches, and as a result, corresponding codes that are not in their respective valid time frames will not be found in a search. Because there are multiple search criteria, various search algorithms or combinations thereof may be employed to optimize search efficiency.

In another aspect of the embodiment, the directing internet application sends additional information such as geographic location or geolocation information and/or age information of the user to the directing server. The additional information may be manually input by the user, previously entered and saved, and/or automatically obtained by the directing internet application. The geolocation information may be obtained from the device's IP address which is normally accurate to the city level in the United States. In case the device is a mobile device, cell tower information, wi-fi information, and GPS information may be used to further refine the location. If the device has a location service, such as Android devices' Google Location Services API, the geolocation information can be directly obtained from the service. The location information may also be manually entered by the user. For example, a user may set the area limitation to be the entire California, the entire San Francisco Bay Area, or East Bay Area, or limit the search area to be one or more cities.

If there are relevant additional criteria such as geographic or age limitation associated with the corresponding code stored in the directing database, the directing server will compare the additional information to the stored criteria. If all the criteria are met, the corresponding web address will be sent to the directing internet application. If one or more of the criteria are not met, appropriate error messages and/or instructions will be sent. If multiple entries are found under the same corresponding code, the user may be prompted to choose an entry.

In another embodiment, the redirecting process begins by a user entering a search code into the directing internet application or a web browser where the directing internet application resides. The directing application then launches a web browser and directs the web browser to a redirecting web page on the directing server. The web browser sends a search request to the redirecting webpage. The search request may include information including the search code and optionally additional information such as geographic location information and/or age information of the user. The directing server checks the search code for a matching corresponding code in the directing database. If no matching corresponding code is found, an error message is sent back to the browser. If a matching corresponding code is found, the directing server will redirect the web browser to the corresponding web address for the matching corresponding code. Thus, the user will be able to browse to the corresponding web page without typing in a long web address.

Thousands of corresponding codes can be achieved by a mere two or three-digit alphanumeric code even if the code includes only the English alphabets a-z and the numbers 0-9: $(26+10)^3=46,656$ for three digits, and $(26+10)^2=1296$ for two digits, and that does not yet include the distinction of capital letters. That may be enough for a large metropolitan area, especially if each code has a limited time duration. A four-digit corresponding code includes $36^4=1.7$ million combinations, and it would be enough to give each phone book entry a unique code, plus any temporary promotional codes that may be required. In some instances, a longer corresponding code may be desired because that is easier to remember. For example, a store may run a promotion in a certain geographic area in June and designate a corresponding code "summer sale" to a promotional webpage. The additional criteria associated with the code may include the geographic location and the time frame of the promotion.

On the other hand, even though thousands or even millions of combinations are possible from the combination of a few digits, the supply is very limited in view of the vast demand from the whole world. Therefore, the additional criteria including the predetermined time frame and geographic location limitation are helpful to make the limited possible combinations feel plentiful. Because the pairing of a corresponding code and a corresponding web address is valid only for a limited time frame, the corresponding code can be reused in another pairing in the future when the prior pairing has expired. Additionally, the geographic location limitation will enable a same short code to be used at different locations at the same time but pointing to different web addresses.

Figure 5:
FIG. 5 shows an example of a web interface where a user can input a corresponding code to retrieve a corresponding web address.

In another embodiment as shown in FIG. 5, users may access a directing server using a web browser via a web interface. The web browser may be any browser, for example, Internet Explorer, Firefox, and Google Chrome. The directing server has its own web address, and in the example shown it is www.riatt.com. When a user accesses the directing server at its website, a webpage shown in FIG. 5 is displayed, which prominently shows an input field for the user to input a corresponding code. If the user inputs a corresponding code, the directing server searches for a matching corresponding web address. Additionally, the website may gather additional information from the user's browser including IP address, from which the directing server will be able to determine the geographic location of the user. If the corresponding code and geographic location match the criteria in the directing database of the directing server, and if the search is done in a valid time frame preset for the corresponding code, the user will be sent the corresponding web address, or the user will be directly linked to the web page of the corresponding web address. In another aspect of the embodiment, the directing server may be accessed from a business partner's website, for example, a radio station's website. The listeners of a radio station will already know the radio station's web address. The radio station's website may include a field for a listener to input the corresponding code, and the radio advertisement will include the corresponding code and ask listener to go the website and input the corresponding code.

In another aspect of the embodiment, the corresponding code application processing server and the directing server are hosted on the same website. A business customer may create an account, pay a fee, and register a corresponding code, a corresponding web address for a webpage for a sales promotion, and any additional criteria including the valid time frame and geographic location limitation. The business customer may then run an advertisement, for example a radio advertisement, that features the corresponding code and where the code can be used. A listener of the radio advertisement will be able to remember the corresponding code, and then use it to easily find the webpage for the sales promotion.

In another embodiment, the method and system of the present invention is integrated with a search engine, where the search engine is given access to the directing server or the directing database. When a user searches for a search code, the search engine searches in the directing database for a match with a corresponding code. If a match is found, the search is conducted from the corresponding geographic area, and the search is conducted within the time frame when the corresponding code is valid, the corresponding web address will be preferentially displayed in the search results. The search engine may be a universal search engine that searches the entire world wide web. Alternatively, the search engine may be a limited one, for example, one that is on a business partner's website that searches only the website where it resides and the directing database. Multiple business partners may be given access to the same directing database. By integrating with a search engine, a separate search field for corresponding code is not needed on the business partner's website.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A computer system including one or more processors and one or more non-transitory computer readable media having processor readable program code embodied on at least one of said non-transitory computer readable media, said program code programming at least one processor to perform a method, comprising:
    assigning a unique corresponding code to a corresponding web address, wherein a matching relationship between said corresponding code and said corresponding web address is valid only in a predetermined time frame;
    storing said corresponding code, said corresponding web address, and said predetermined time frame information in a directing database;
    showing or broadcasting said corresponding code publicly;
    receiving from a requestor a search request that includes a search code that does not include a web address;
    determining whether said search code matches said corresponding code, and whether said search request is received in said predetermined time frame; and
    if it is determined that said search code matches said corresponding code and that said search request is received in said predetermined time frame, retrieving said corresponding web address, and sending said corresponding web address to said requestor.

2. The computer system of claim 1, wherein said corresponding code is an alphanumeric code 1-8 digits long.

3. The computer system of claim 2, wherein said corresponding code is 2-5 digits long.

4. The computer system of claim 1, further comprising:
    if it is determined that said search code does not match any corresponding code in its respective predetermined time frame, sending an error message to said requestor.

5. The computer system of claim 1, further comprising:
    assigning and storing a geographic location limitation to said corresponding code in said directing database;
    comparing geographic location of said requestor to said geographic location limitation; and
    only if said geographic location satisfies said geographic location limitation, sending said corresponding web address to said requestor.

6. The computer system of claim 5, wherein:
    said geographic location is determined based on an IP address of said requestor.

7. The computer system of claim 5, wherein:
    a web interface is used to receive said request for corresponding web address;
    said web interface is adapted to be accessible by said requestor using a web browser; and said web interface is adapted to retrieve an IP address of said requestor and to determine the geographic location of said requestor based on said IP address.

8. The computer system of claim 5, wherein:
one or more pairs of matching corresponding code and corresponding web addresses are assigned for one or more business customers; and
one or more of said corresponding web addresses have domain names owned by said business customers.

9. The computer system of claim 8, wherein:
said business customers determine said predetermined time frame and said geographic location limitation.

10. A method for rapid webpage access, comprising:
obtaining a search code that has been publicly shown or broadcast;
sending a search request that includes a search code to a directing server using an internet application; and
receiving a response from said directing server, wherein said request does not include a web address;
said directing server includes a directing database;
said directing database includes one or more pairs of corresponding code and corresponding web address, wherein a matching relationship exists between the corresponding code and the corresponding web address within a pair, and the matching relationship is valid only in a predetermined time frame; and
said directing server determines whether said search code matches any corresponding code in said directing database, and whether said search code is received in said predetermined time frame; and
if it is determined that said search code matches said corresponding code and that said search code is received in said predetermined time frame, the directing server sends the corresponding web address that matches the search code to said internet application.

11. The method of claim 10, wherein said corresponding code is an alphanumeric code 1-8 digits long.

12. The method of claim 11, wherein said corresponding code is 2-5 digits long.

13. The method of claim 10, wherein:
if it is determined that said search code does not match any corresponding code in said predetermined time frame when said matching relationship between said corresponding code and said corresponding web address is valid, the directing server sends an error message to said internet application.

14. The method of claim 10, wherein:
a geographic location limitation is attached to each pair of corresponding code and corresponding web address;
the directing server compares the geographic location from where the search request is sent, to said geographic location limitation; and
only if said geographic location satisfies said geographic location limitation, sending said corresponding web address to said requestor.

15. The method of claim 14, wherein:
said search request includes geographic location information, or
said geographic location is determined based on an IP address from where the request is sent.

16. The method of claim 14, wherein:
the directing server uses a web interface to receive said search request;
said search request is sent through said web interface using a web browser;
said web interface is adapted to retrieve an IP address from said web browser; and
said directing server determines the geographic location based on said IP address.

17. The method of claim 14, wherein:
one or more pairs of matching corresponding code and corresponding web addresses are assigned for one or more business customers; and
one or more of said corresponding web addresses have domain names owned by said business customers.

18. The method of claim 17, wherein:
said business customers determine said predetermined time frame and said geographic location limitation.

* * * * *